(12) United States Patent
Sishtla et al.

(10) Patent No.: US 11,306,950 B2
(45) Date of Patent: Apr. 19, 2022

(54) LUBRICATION SUPPLY SYSTEM

(71) Applicant: Carrier Corporation, Palm Beach Gardens, FL (US)

(72) Inventors: Vishnu M. Sishtla, Manlius, NY (US); Scott A. Nieforth, Clay, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 16 days.

(21) Appl. No.: 16/624,865

(22) PCT Filed: Jul. 27, 2018

(86) PCT No.: PCT/US2018/044158
§ 371 (c)(1),
(2) Date: Dec. 19, 2019

(87) PCT Pub. No.: WO2019/023618
PCT Pub. Date: Jan. 31, 2019

(65) Prior Publication Data
US 2020/0141617 A1 May 7, 2020

Related U.S. Application Data

(60) Provisional application No. 62/538,490, filed on Jul. 28, 2017.

(51) Int. Cl.
*F25B 43/02* (2006.01)
*F25B 31/00* (2006.01)
(Continued)

(52) U.S. Cl.
CPC ........ *F25B 31/002* (2013.01); *F04B 39/0284* (2013.01); *F25B 1/053* (2013.01);
(Continued)

(58) Field of Classification Search
CPC .... F25B 31/002; F25B 1/053; F25B 2500/16; F25B 31/004; F25B 31/006; F25B 31/008;
(Continued)

(56) References Cited

U.S. PATENT DOCUMENTS 3,195,965 A 7/1965 Van Dorn
5,421,708 A 6/1995 Utter et al.
(Continued)

FOREIGN PATENT DOCUMENTS

CN 1141070 A 1/1997
CN 101035982 A 9/2007
(Continued)

OTHER PUBLICATIONS

ISR/WO, dated Oct. 24, 2018, 15 pages total.
European Search Report Application No. EP21176727; dated Sep. 29, 2021; pp. 6.

*Primary Examiner* — Henry T Crenshaw
*Assistant Examiner* — Kamran Tavakoldavani
(74) *Attorney, Agent, or Firm* — Cantor Colburn LLP

(57) ABSTRACT

A lubrication additive recovery system is provided for use with a vapor compression system. The vapor compression system includes a compressor having a bearing, a condenser and an evaporator. The lubrication additive recovery system includes a lubrication ring formed to define first and second through-holes, a first system by which a portion of a required supply of lubrication is drawn from the condenser and provided to the bearing through the first through-holes and a second system by which a remainder of the required supply of lubrication is recovered from the evaporator and provided along with compressor discharge gas to the bearing through the second through-holes.

20 Claims, 6 Drawing Sheets

(51) Int. Cl.
  *F04B 39/02* (2006.01)
  *F25B 1/053* (2006.01)
  *F16N 39/06* (2006.01)

(52) U.S. Cl.
  CPC .......... *F16N 39/06* (2013.01); *F16N 2210/10* (2013.01); *F25B 2500/16* (2013.01)

(58) Field of Classification Search
  CPC ...... F04B 39/0284; F04B 39/02; F04B 53/18; F16N 39/06; F16N 2210/10; F16C 33/6659
  USPC .......................................................... 62/468
  See application file for complete search history.

(56) References Cited

U.S. PATENT DOCUMENTS

| | | | |
|---|---|---|---|
| 5,461,883 A | 10/1995 | Terasaki | |
| 5,881,564 A | 3/1999 | Kishimoto et al. | |
| 6,182,467 B1 | 2/2001 | Zhong et al. | |
| 6,216,474 B1 | 4/2001 | Sishtla | |
| 6,834,514 B2 | 12/2004 | Takeuchi et al. | |
| 7,059,150 B2 | 6/2006 | Komatsu et al. | |
| 8,939,650 B2* | 1/2015 | Berruet | F16C 33/58 384/475 |
| 9,243,827 B2 | 1/2016 | Kim et al. | |
| 9,410,547 B2 | 8/2016 | Toyama et al. | |
| 9,464,832 B2 | 10/2016 | Higashiiue | |
| 9,618,245 B2 | 4/2017 | Yokoyama et al. | |
| 2011/0120154 A1* | 5/2011 | Woolley | F25B 31/004 62/84 |
| 2011/0126560 A1* | 6/2011 | Wightman | F25B 41/31 62/80 |
| 2012/0266613 A1* | 10/2012 | Rodriguez | F25B 31/006 62/62 |
| 2014/0341710 A1* | 11/2014 | Creamer | G05B 13/024 415/111 |
| 2014/0360210 A1* | 12/2014 | Lapp | F04D 17/10 62/84 |
| 2016/0003510 A1 | 1/2016 | De Larminat et al. | |
| 2016/0003511 A1 | 1/2016 | Esformes et al. | |
| 2016/0040915 A1 | 2/2016 | Jonsson et al. | |
| 2016/0047575 A1 | 2/2016 | Jonsson et al. | |
| 2016/0116190 A1 | 4/2016 | Oda et al. | |
| 2016/0252285 A1* | 9/2016 | Rubinstein | F25B 15/04 62/141 |
| 2017/0045087 A1 | 2/2017 | Schweitzer et al. | |
| 2017/0051743 A1 | 2/2017 | Sakai et al. | |
| 2017/0097007 A1* | 4/2017 | Sishtla | F04D 17/08 |

FOREIGN PATENT DOCUMENTS

| | | |
|---|---|---|
| CN | 103375490 A | 10/2013 |
| CN | 104075476 A | 10/2014 |
| CN | 104949367 A | 9/2015 |
| CN | 105829716 A | 8/2016 |
| CN | 106091188 A | 11/2016 |
| CN | 205783937 U | 12/2016 |
| CN | 106679227 A | 5/2017 |
| CN | 104075475 A | 12/2017 |
| EP | 1009934 B1 | 6/2000 |
| EP | 2657553 A1 | 12/2014 |
| EP | 3183514 A1 | 6/2017 |
| JP | 2009063234 A | 3/2009 |
| WO | 2013140992 A1 | 9/2013 |
| WO | 2017024101 A1 | 2/2017 |
| WO | 2017027701 A1 | 2/2017 |

\* cited by examiner

LUBRICATION SUPPLY SYSTEM

CROSS-REFERENCE TO RELATED APPLICATIONS

This application claims the benefit of PCT/US2018/044158 filed Jul. 27, 2018, which claims priority to U.S. Provisional Application No. 62/538,490 filed Jul. 28, 2017, which is incorporated herein by reference in its entirety.

BACKGROUND

The following description relates to lubrication supply systems and, more specifically, to lubrication supply systems in which lubrication recovered from an evaporator is provided to a bearing supply passage.

A vapor compression system is typically configured to perform a vapor compression cycle and includes a compressor, a condenser, an optional economizer and an evaporator (or cooler) among other elements. Vapor is received by and compressed in the compressor before being output as compressor discharge gas to the condenser. The compressor discharge gas condenses within the condenser and is output as condensed liquid to the optional economizer (where available) or to the evaporator. The condensed liquid is vaporized in the evaporator and is output to the compressor once again as vapor.

The compressor typically includes a rotating shaft that is supported by bearings which need to be lubricated. A required amount of lubrication for a given vapor compression system under a given load is predefined and can be drawn from condensed liquid of the condenser. Such condensed liquid is pumped along with lubrication from the condenser, through a compressor bearing lubrication ring and to one or more of the bearings. Generally, the compressor bearing lubrication ring has through-holes extending through it to deliver the condensed liquid and the lubrication to various portions of the one or more bearings.

Over time, an amount of lubrication that can be pumped out of the condenser decreases due to lubrication and other fluids pooling in the evaporator. Eventually, this can lead to a case in which the condensed liquid is pumped out of the condenser with an insufficient amount of lubrication.

BRIEF DESCRIPTION

According to an aspect of the disclosure, a lubrication additive recovery system is provided for use with a vapor compression system. The vapor compression system includes a compressor having a bearing, a condenser and an evaporator. The lubrication additive recovery system includes a lubrication ring formed to define first and second through-holes, a first system by which a portion of a required supply of lubrication is drawn from the condenser and provided to the bearing through the first through-holes and a second system by which a remainder of the required supply of lubrication is recovered from the evaporator and provided along with compressor discharge gas to the bearing through the second through-holes.

In accordance with additional or alternative embodiments, the lubrication ring comprises an annular body and the first and second through-holes are respectively arranged in first and second separate arc-segments of the annular body.

In accordance with additional or alternative embodiments, the first system includes a first fluid movement element configured to pump the portion of the required supply of lubrication from the condenser to the bearing and the second system includes a second fluid movement element configured to draw the compressor discharge gas from piping fluidly connecting the compressor and the condenser for provision thereof to the bearing and recover the remainder of the required supply of lubrication from the evaporator for provision thereof to the bearing.

In accordance with additional or alternative embodiments, the first fluid movement element includes a pump and the second fluid movement element comprises an eductor.

In accordance with additional or alternative embodiments, filters are fluidly interposed between the first fluid movement element and the first through-holes and between the second fluid movement element and the second through-holes.

In accordance with additional or alternative embodiments, strainers are fluidly interposed between the condenser and the first fluid movement element and between the evaporator and the second fluid movement element.

In accordance with additional or alternative embodiments, sensors are configured to sense fluid levels in the condenser and in the evaporator.

In accordance with additional or alternative embodiments, the portion of the required supply of lubrication includes pressurized refrigerant and the remainder of the required supply of lubrication includes a lubrication additive rich refrigerant mixture.

In accordance with additional or alternative embodiments, a controller is configured to control operations of the pump in accordance with relative magnitudes of the portion and the remainder of the required supply of lubrication.

According to another aspect of the disclosure, a lubrication additive recovery system is provided for use with a vapor compression system. The vapor compression system includes a compressor having a bearing, a condenser and an evaporator. The lubrication additive recovery system includes an eductor and a pump configured to pump a portion of a required supply of lubrication from the condenser and to the bearing through the eductor such that the eductor recovers a remainder of the required supply of lubrication from the evaporator for provision thereof to the bearing.

In accordance with additional or alternative embodiments, the lubrication additive recovery system further includes a lubrication ring through which the portion and the remainder of the required supply of lubrication are pumped and provided to the bearing, respectively.

In accordance with additional or alternative embodiments, a valve is fluidly interposed between the evaporator and the eductor and is configured to permit fluid flow in only a single direction.

In accordance with additional or alternative embodiments, the eductor includes an outlet a first pathway leading from a first inlet immediately downstream from the pump to the outlet and a second pathway leading from a second inlet downstream from the evaporator to the first pathway.

In accordance with additional or alternative embodiments, a single filter is fluidly interposed between the eductor and the bearing.

In accordance with additional or alternative embodiments, strainers are fluidly interposed between the condenser and the pump and between the evaporator and the eductor.

In accordance with additional or alternative embodiments, sensors are configured to sense fluid levels in the condenser and in the evaporator.

In accordance with additional or alternative embodiments, the portion of the required supply of lubrication includes pressurized refrigerant and the remainder of the required supply of lubrication includes a lubrication additive rich refrigerant mixture.

In accordance with additional or alternative embodiments, a controller is configured to control operations of the pump in accordance with relative magnitudes of the portion and the remainder of the required supply of lubrication.

According to yet another aspect of the disclosure, a bearing lubrication ring assembly is provided and includes a bearing and a lubrication ring disposed proximate to the bearing and formed to define first and second through-holes. The first through-holes are receptive of a portion of a required supply of lubrication pumped from a condenser. The second through-holes are receptive of compressor discharge gas and a remainder of the required supply of lubrication drawn from an evaporator by the pumping.

In accordance with additional or alternative embodiments, the lubrication ring includes an annular body disposed about the bearing and the first and second through-holes are respectively arranged in first and second separate arc-segments of the annular body.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a system is provided whereby an amount of lubrication included in condensed liquid that is pumped out of a condenser and to a bearing of a compressor is supplemented with lubrication drawn from an evaporator or cooler (hereinafter referred to as an "evaporator"). That is, a lubrication additive rich mixture which has accumulated in the evaporator of a vapor compression system is recovered and delivered to the bearing cavity of a compressor bearing. An eductor with no moving parts is used to transfer the lubrication additive rich refrigerant mixture from the evaporator to the bearing cavity so as to supplement pressurized refrigerant supply that is delivered from the condenser.

Figure 1:
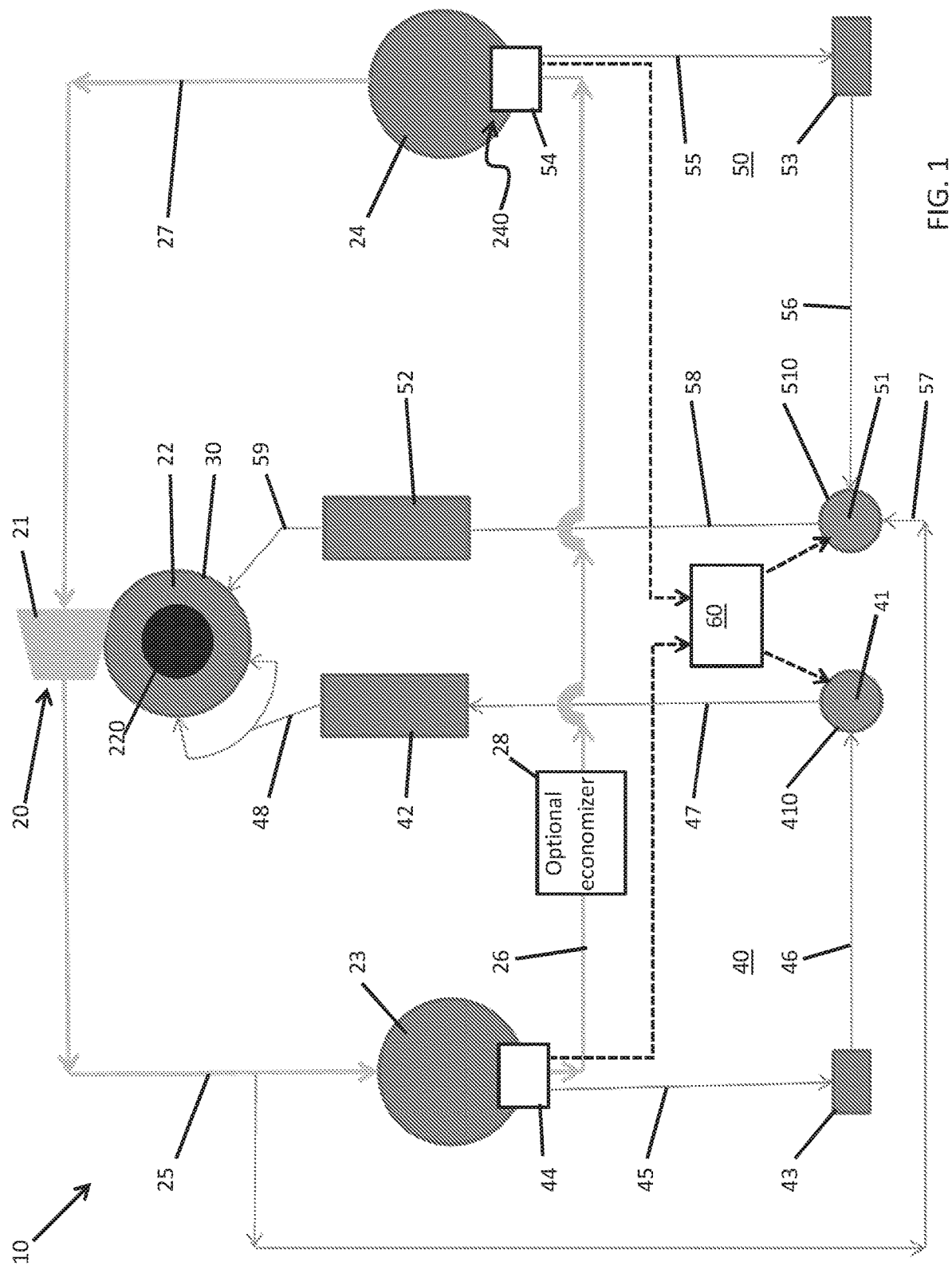
FIG. 1 is a schematic diagram of a lubrication additive recovery system in accordance with embodiments.

With reference to FIG. 1, a lubrication additive recovery system 10 is provided for use with a vapor compression system 20. The vapor compression system 20 includes a compressor 21 having a bearing 22, a condenser 23 and an evaporator 24. Vapor is received by the compressor 21 and compressed in an interior of the compressor 21. The bearing 22 supports a rotatable shaft 220 of the compressor 21 and requires that a predefined amount of lubrication or lubrication additive (hereinafter referred to as "lubrication") be supplied thereto by the lubrication additive recovery system 10. Compressor discharge gas is output from the compressor 21 and provided to the condenser 23 by way of first piping 25. The compressor discharge gas condenses within the condenser 23 and is output along second piping 26 to the evaporator 24 as condenser liquid. The condenser liquid is evaporated in the evaporator 24 and output along third piping 27 to the compressor 21 as vapor.

The vapor compression system 20 may further include an optional economizer 28 disposed along the second piping 26 between the condenser 23 and the evaporator 24. The following description relates to cases in which liquid is pumped from the condenser 23 for use in lubricating the bearing 22. It is to be understood, however, that liquid can also or alternatively be pumped from the optional economizer 28 without departing from the scope of the application.

Figure 2:
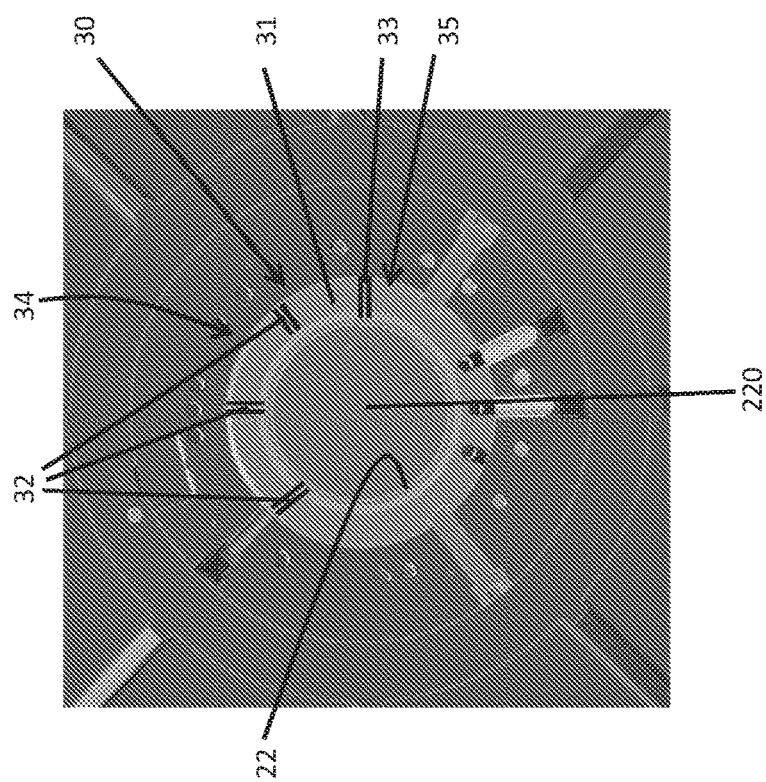
FIG. 2 is an axial view of a lubrication ring of the lubrication additive recovery system of FIG. 1.

With continued reference to FIG. 1 and with additional reference to FIG. 2, the lubrication additive recovery system 10 includes a lubrication ring 30, a first system 40 and a second system 50.

As shown in FIG. 2, the lubrication ring 30 is disposable proximate to the bearing 22 and, where the bearing 22 has an annular shape, the lubrication ring 30 may include an annular body 31 which is disposed annularly about the bearing 22. In any case, the lubrication ring 30 is formed to define a set of first through-holes 32 and a set of one or more second through-holes 33. Where the lubrication ring 30 includes the annular body 31, the set of first through-holes 32 may be defined to extend from close to an outer diameter of the bearing 22 along a radial dimension in a first arc-segment 34 of the annular body 31 and the set of one or more second through-holes 33 may be defined to extend from close to the outer diameter of the bearing 22 along the radial dimension in a second arc-segment 35 of the annular body 31 which is separate and distinct from the first arc-segment 34.

As shown in FIG. 1, the first system 40 is configured such that a portion of a required supply of lubrication is drawn from the condenser 23 and provided to the bearing 22 through the set of first through-holes 32 of the first arc-segment 34 of the lubrication ring 30 and the second system 50 is configured such that a remainder of the required supply of lubrication is recovered from the evaporator 24 and provided along with compressor discharge gas received from the first piping 25 to the bearing 22 through the set of one or more second through-holes 33 of the second arc-segment 35 of the annular body 31. As such, between the operations of the first and second systems 40 and 50, the required amount of lubrication is provided to the bearing 22 at various locations thereof which correspond to those of the respective sets of the first through-holes 32 and the one or more second through-holes 33.

The first system 40 includes a first fluid movement element 41, such as a pump 410, which is configured to pump the portion of the required supply of lubrication from the condenser 23 and toward the bearing 22 as, for example, pressurized refrigerant that includes some quantity of lubrication or lubrication additive. The first system 40 may further include a first filter 42, a first strainer 43 and a first sensor 44 as well as first-fourth piping segments 45-48. The first filter 42 may be provided as a condenser liquid filter or another similar filter and may be fluidly interposed between the first fluid movement element 41 and the set of first through-holes 32 of the annular body 31. The first strainer 43 may be provided as a condenser strainer and may be fluidly interposed between the condenser 23 and the first fluid movement element 41. The first sensor 44 is configured to sense fluid levels in the condenser 23 and, in particular, to sense an amount of lubrication that may be available in the condenser 23 for provision to the first system 40 and in turn to the bearing 22. The first-fourth piping segments 45-48 respectively fluidly interconnect the condenser 23 and the first sensor 44 with the first strainer 43, the first strainer 43 with the first fluid movement element 41, the first fluid movement element 41 with the first filter 42 and the first filter 42 with the set of first through-holes 32.

The second system 50 includes a second fluid movement element 51, such as an additive reclaim eductor (hereinafter referred to as an "eductor" 510), which is configured to draw the compressor discharge gas from the first piping 25 as well as a remainder of the required supply of lubrication from a pooling location 240 defined within the evaporator 24 for provision of the compressor discharge gas and the remainder of the required supply of lubrication toward the bearing 22 as, for example, a lubrication additive rich mixture. The second system 50 may further include a second filter 52, a second strainer 53 and a second sensor 54 as well as fifth-ninth piping segments 55-59. The second filter 52 may be provided as a cooler liquid filter or another similar filter and may be fluidly interposed between the second fluid movement element 51 and the set of one or more second through-holes 33 of the annular body 31. The second filter 52 may be operable at different pressures as the first filter 42. The second strainer 53 may be provided as an evaporator strainer and may be fluidly interposed between the evaporator 24 and the second fluid movement element 51. The second sensor 54 is configured to sense fluid levels in the evaporator 24 and, in particular, to sense an amount of lubrication that may be available in the pooling location 240 for provision to the second system 50 and in turn to the bearing 22. The fifth-ninth piping segments 55-59 respectively fluidly interconnect the evaporator 24 and the second sensor 54 with the second strainer 53, the second strainer 53 with the second fluid movement element 51, the first piping 25 with the second fluid movement element 51, the second fluid movement element 51 with the second filter 52 and the second filter 52 with the set of one or more second through-holes 33.

Figure 3:
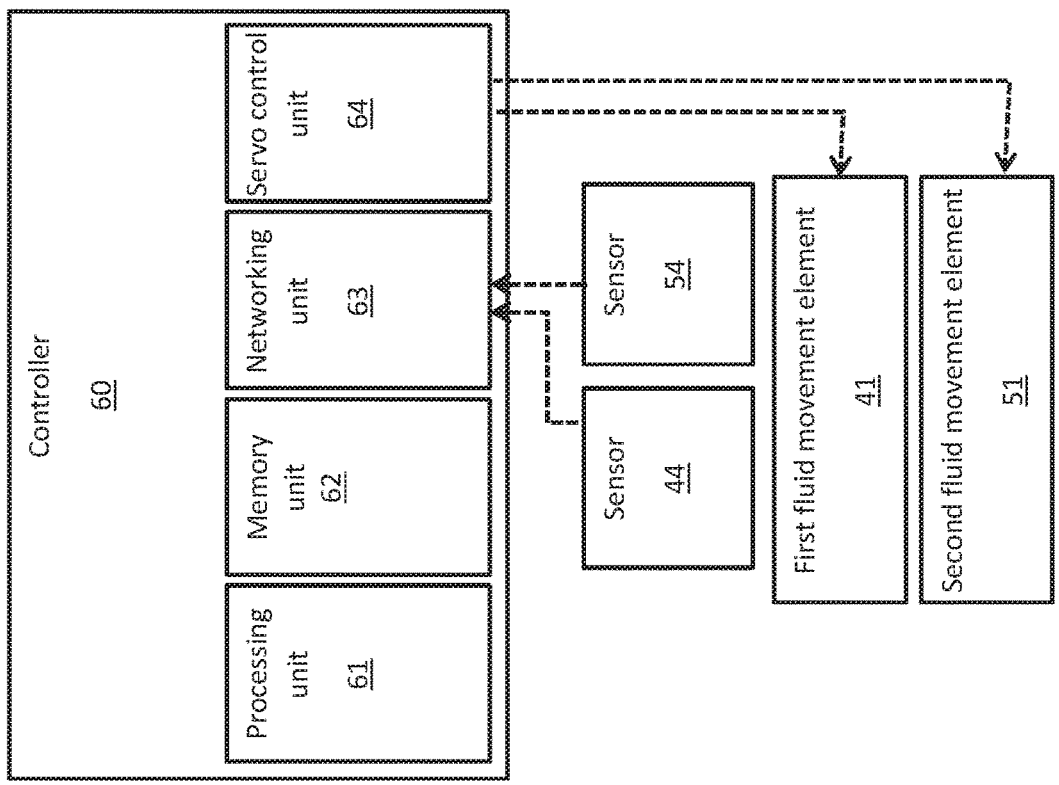
FIG. 3 is a schematic diagram of a controller of the lubrication additive recovery system of FIGS. 1 and 2.
Figure 4:
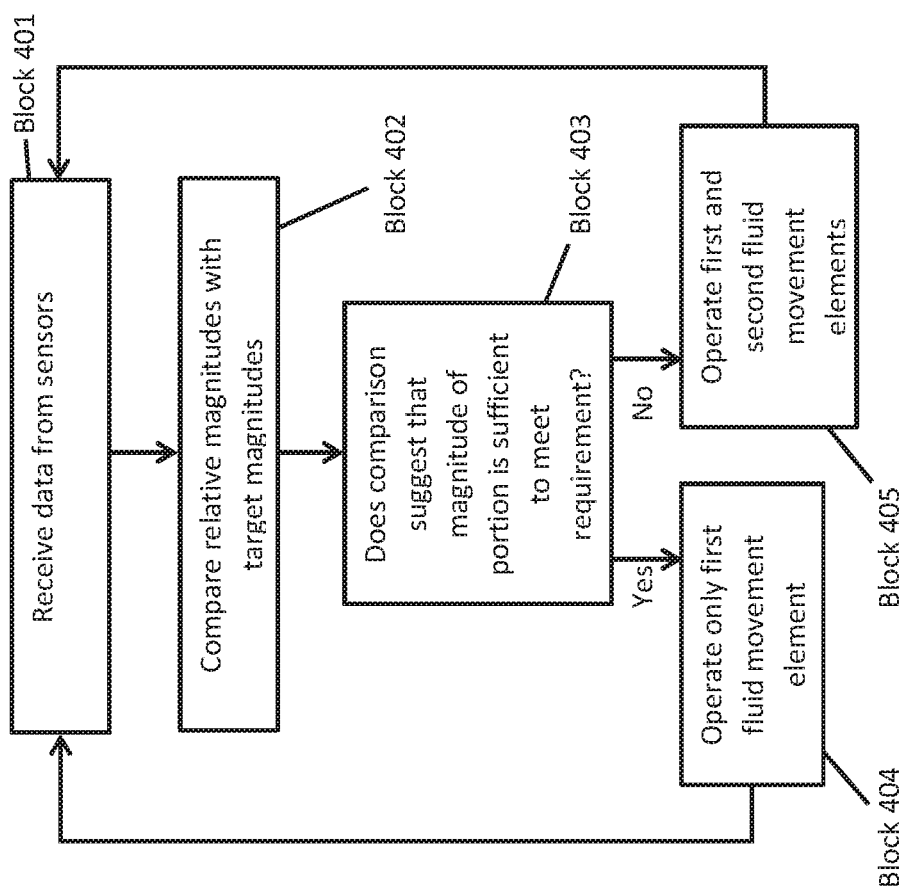
FIG. 4 is a flow diagram illustrating a method of operating the lubrication additive recovery system and controller of FIGS. 1-3.

With continued reference to FIG. 1 and with additional reference to FIGS. 3 and 4, the lubrication additive recovery system 10 may further include a controller 60. The controller 60 is configured to control respective operations of the first and second systems 40 and 50 in accordance with relative magnitudes of the portion and the remainder of the required supply of lubrication provided by each to the bearing 22 and, possibly, in accordance with additional factors.

As shown in FIG. 3, the controller 60 includes a processing unit 61, a memory unit 62, a networking unit 63 and a servo control unit 64. The processing unit 61 may be provided as a central processing unit (CPU) and is communicative with the memory unit 62 and the servo control unit 64 and in addition with the first and second sensors 44 and 54 via the networking unit 63. The servo control unit 64 may be operably coupled to at least the first and second fluid movement elements 41 and 51. The memory unit 62 may have data stored thereon which is reflective of, for example, the required amount of lubrication for the bearing 22 given the dimensions and operational conditions of the bearing 22 as well as a load placed on the vapor compression system 20. The memory unit 62 may also have executable instructions stored thereon, which, when executed by the processing unit 61, cause the processing unit 61 to operate as described herein.

For example, as shown in FIG. 4, the executable instructions may cause the processing unit 61 to initially receive data from the first and second sensors 44 and 54 which is reflective of the relative magnitudes of the portion and the remainder of the required supply of lubricant which are available for provision to the first and second systems 40 and 50 (block 401). Once the data is received, the executable instructions may cause the processing unit 61 to compare the relative magnitudes with target magnitudes (block 402) and to determine from a result of the comparison whether at least the magnitude of the portion of the required supply of lubricant which is available for provision to the first system 40 is sufficient to meet the requirement for lubrication of the bearing 22 (block 403). If the magnitude of the portion of the required supply of lubricant which is available for provision to the first system 40 is sufficient to meet the requirement for lubrication of the bearing 22, the executable instructions may cause the processing unit 61 to issue commands to the servo control unit 64 to operate only the first fluid movement element 41 (block 404) and to switch the second fluid movement element 51 off (where such switching is possible or necessary, i.e., such switching is not necessary where the second fluid movement element 51 is an eductor which is in general neither shut off nor turned on) and to return to block 401 to receive additional data. Conversely, if the magnitude of the portion of the required supply of lubricant which is available for provision to the first system 40 is insufficient to meet the requirement for lubrication of the bearing 22, the executable instructions may cause the processing unit 61 to issue commands to the servo control unit 64 to operate the first and second fluid movement elements 41 and 51 (block 405) and to return to block 401 to receive additional data.

Figure 5:
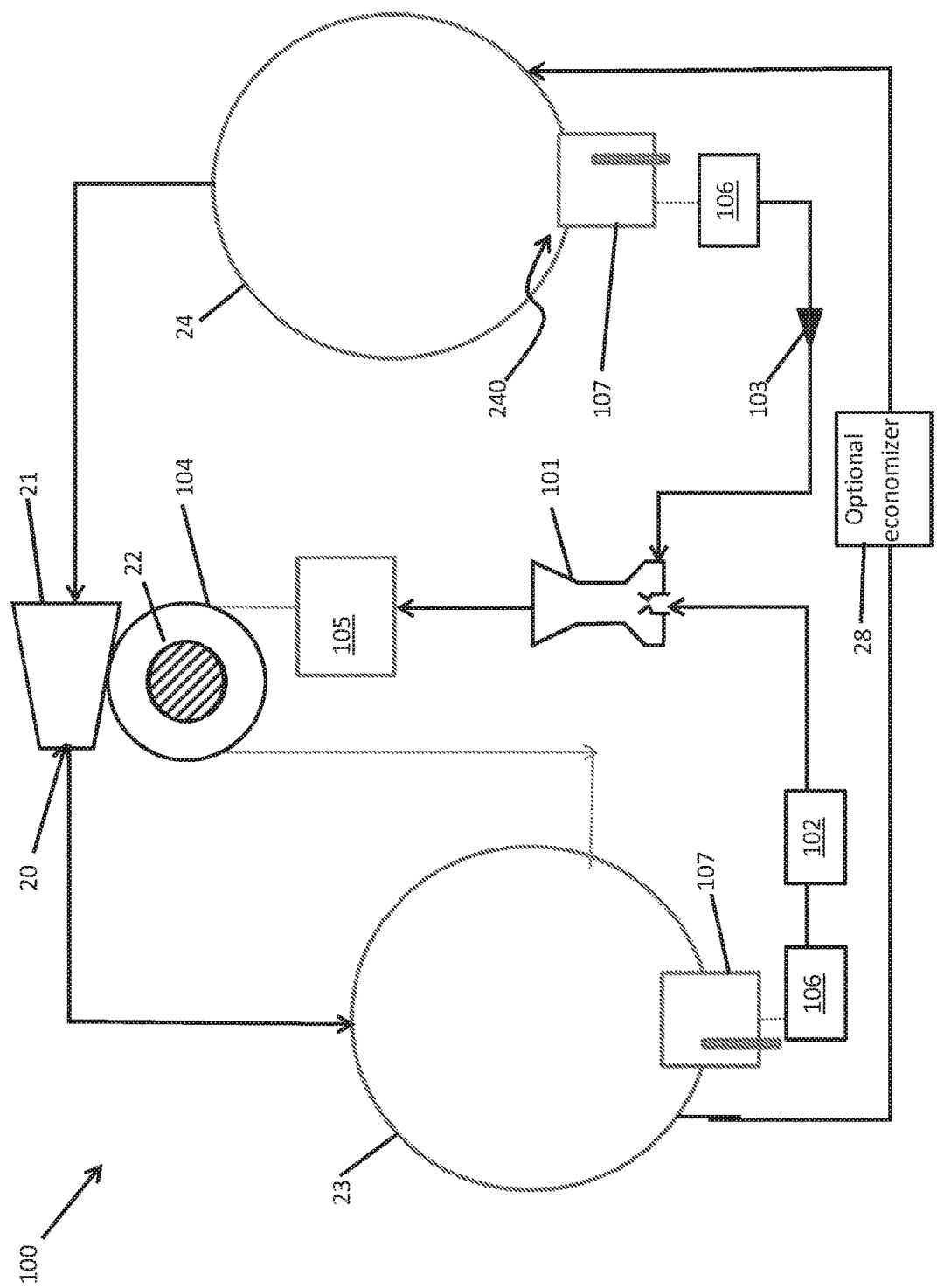
FIG. 5 is a schematic diagram of a lubrication additive recovery system in accordance with alternative embodiments.
Figure 6:
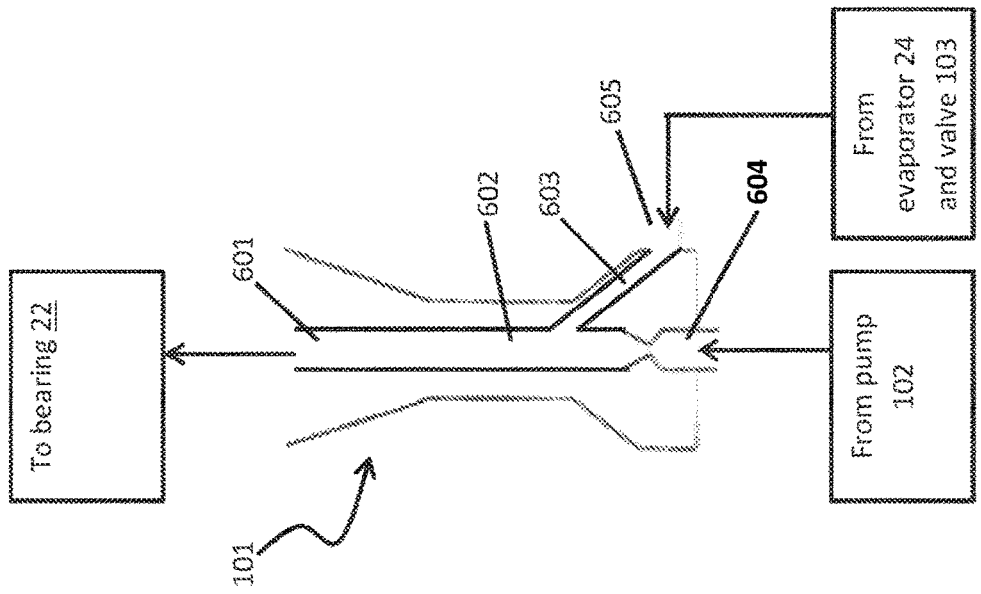
FIG. 6 is a cutaway side view of an eductor of the lubrication additive recovery system of FIG. 4.

With reference to FIGS. 5 and 6, a lubrication additive recovery system 100 is provided for use with a vapor compression system, such as the vapor compression system 10 of FIG. 1. The lubrication additive recovery system 100 and a vapor compression system with which it is used are similar to or include many of the features described above which will not be described again in the following sections.

As shown in FIG. 5, the lubrication additive recovery system 100 includes an eductor 101, a pump 102 and a valve 103. The pump 102 is configured to pump a portion of a required supply of lubrication (e.g., pressurized refrigerant) from the condenser 23 to the bearing 22 through the eductor 101 such that the eductor recovers a remainder of the required supply of lubrication (e.g., a lubrication additive rich refrigerant mixture) from the evaporator 24 for provision thereof to the bearing 22. The valve 103 may be provided as a check valve and is fluidly interposed between the evaporator 24 and the eductor 101 and is configured to permit fluid flow from the evaporator 24 to the eductor 101 in only a single direction. The lubrication additive recovery system 100 may further include a lubrication ring 104, a single filter 105, strainers 106 and sensors 107. The lubrication ring 104 may be similar to the lubrication ring 30 of FIGS. 1 and 2 and thus the portion and the remainder of the required supply of lubrication are pumped and provided to the bearing 22, respectively, through the lubrication ring 104. The filter 105 is fluidly interposed between the eductor 101 and the lubrication ring 104 and the bearing 22. The strainers 106 and the sensors 107 are similar to the first and second strainers 43 and 53 and the first and second sensors 44 and 54 described above. That is, the strainers 106 are fluidly interposed between the condenser 23 and the pump 102 and between the evaporator 24 and the valve 103 and the eductor 101 and the sensors 107 are disposed and configured to sense fluid levels in the condenser 23 and the evaporator 24.

As shown in FIG. 6, the eductor 101 may include an outlet 601, a first pathway 602 and a second pathway 603. The first pathway 602 leads from a first inlet 604 that is immediately downstream from the pump 102 to the outlet 601. The second pathway 603 leads from a second inlet 605, which is disposed downstream from the evaporator 24 and the valve 103, to the first pathway 602. As such, as relatively high pressure fluid is pumped through the first pathway 602 toward the bearing 22 by the pump 102, fluid is drawn from the evaporator 24, through the valve 103 and through the second pathway 603.

The structure of the eductor 101 as explained above and as shown in FIG. 6 may be similar to the eductor 510 of FIG. 1. Thus, in the case of the eductor 510 of FIG. 1, the relatively high pressure of the compressor discharge gas flowing through the first pathway causes fluid to be drawn from the evaporator 24 and into and through the eductor 510.

Figure 7:
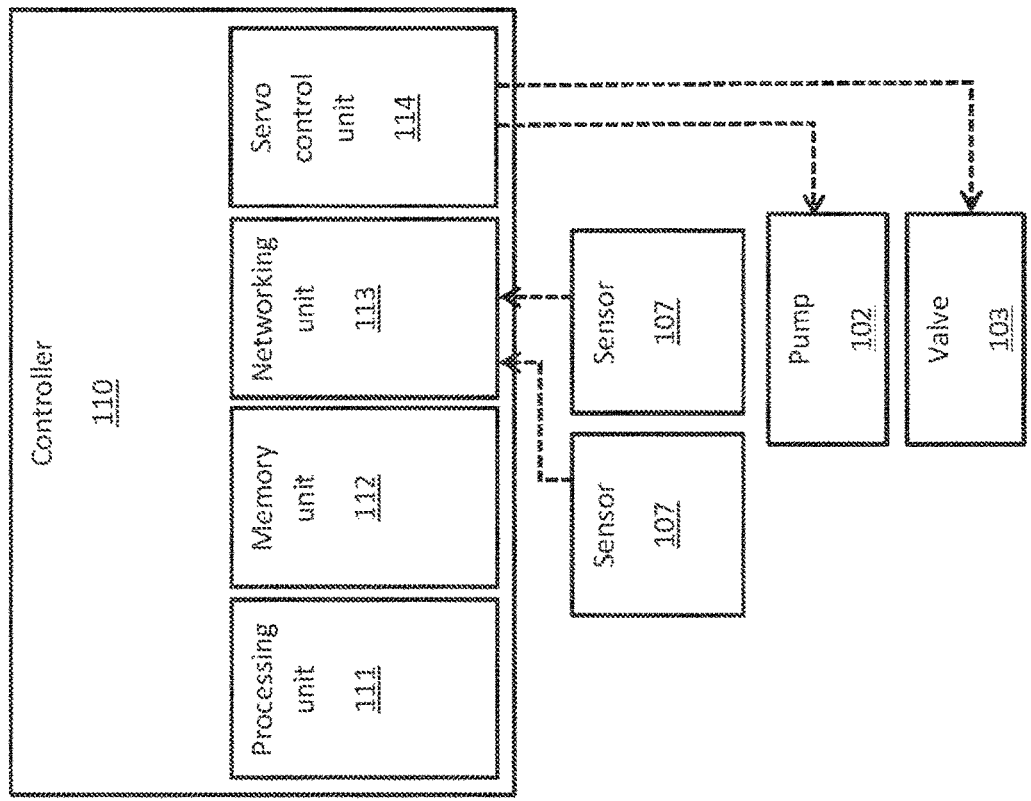
FIG. 7 is a schematic diagram of a controller of the lubrication additive recovery system of FIGS. 5 and 6.
Figure 8:
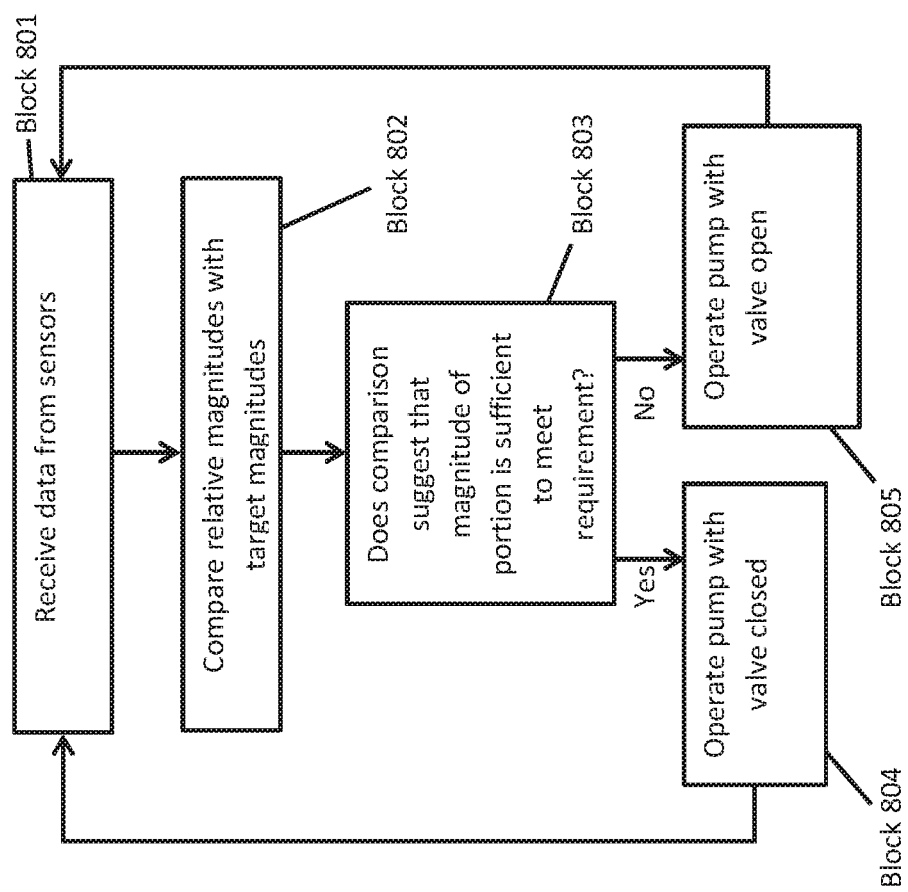
FIG. 8 is a flow diagram illustrating a method of operating the lubrication additive recovery system and controller of FIGS. 5-7.

With continued reference to FIG. 5 and with additional reference to FIGS. 7 and 8, the lubrication additive recovery system 100 may further include a controller 110. The controller 110 is configured to control operations of the pump 102 and the valve 103 in accordance with relative magnitudes of the portion and the remainder of the required supply of lubrication provided by each to the bearing 22 and, possibly, in accordance with additional factors.

As shown in FIG. 7, the controller 110 includes a processing unit 111, a memory unit 112, a networking unit 113 and a servo control unit 114. The processing unit 111 may be provided as a central processing unit (CPU) and is communicative with the memory unit 112 and the servo control unit 114 and in addition with the sensors 107 via the networking unit 113. The servo control unit 114 may be operably coupled with at least the pump 102 and the valve 103. The memory unit 112 may have data stored thereon which is reflective of, for example, the required amount of lubrication for the bearing 22 given the dimensions and operational conditions of the bearing 22 as well as a load placed on the vapor compression system 20. The memory unit 112 may also have executable instructions stored thereon, which, when executed by the processing unit 111, cause the processing unit 111 to operate as described herein.

For example, as shown in FIG. 8, the executable instructions may cause the processing unit 111 to initially receive data from the sensors 107 which is reflective of the relative magnitudes of the portion and the remainder of the required supply of lubricant which are available for provision to the bearing 22 (block 801). Once the data is received, the executable instructions may cause the processing unit 111 to compare the relative magnitudes with target magnitudes (block 802) and to determine from a result of the comparison whether at least the magnitude of the portion of the required supply of lubricant which is available for provision to the bearing 22 is sufficient to meet the requirement for lubrication of the bearing 22 (block 803). If the magnitude of the portion of the required supply of lubricant which is available for provision to the bearing 22 is sufficient to meet the requirement for lubrication of the bearing 22, the executable instructions may cause the processing unit 111 to issue commands to the servo control unit 114 to activate the pump 102 and to close the valve 103 (block 804) and to return to block 801 to receive additional data. Conversely, if the magnitude of the portion of the required supply of lubricant which is available for provision to the bearing 22 is insufficient to meet the requirement for lubrication of the bearing 22, the executable instructions may cause the processing unit 111 to issue commands to the servo control unit 114 to operate the pump 102 with the valve 103 open so that fluid is drawn from the evaporator 24, through the valve 103 and the eductor 101 toward the bearing 22 (block 805) and to return to block 801 to receive additional data.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A lubrication additive recovery system for a vapor compression system including a compressor having a bearing, a condenser and an evaporator, the lubrication additive recovery system comprising:
   a lubrication ring formed to define first and second through-holes;
   a first fluid system by which a portion of a required supply of lubrication is drawn from the condenser and provided to the bearing through the first through-holes;
   a second fluid system by which a remainder of the required supply of lubrication is recovered from the evaporator and provided along with compressor discharge gas to the bearing through the second through-holes; and
   a controller configured to control respective operations of the first and second fluid systems in accordance with a magnitude of the portion of the required supply of lubrication, which is drawn from the condenser, and in accordance with a magnitude of the remainder of the required supply of lubrication, which is recovered from the evaporator.

2. The lubrication additive recovery system according to claim 1, wherein:
   the lubrication ring comprises an annular body, and
   the first and second through-holes are respectively arranged in first and second separate arc-segments of the annular body.

3. The lubrication additive recovery system according to claim 1, wherein:
   the first fluid system comprises a first fluid movement element configured to pump the portion of the required supply of lubrication from the condenser to the bearing, and the second fluid system comprises a second fluid movement element configured to draw the compressor discharge gas from piping fluidly connecting the compressor and the condenser for provision thereof to the bearing and recover the remainder of the required supply of lubrication from the evaporator for provision thereof to the bearing.

4. The lubrication additive recovery system according to claim 3, wherein the first fluid movement element comprises a pump and the second fluid movement element comprises an eductor.

5. The lubrication additive recovery system according to claim 3, further comprising filters fluidly interposed between the first fluid movement element and the first through-holes and between the second fluid movement element and the second through-holes.

6. The lubrication additive recovery system according to claim 3, further comprising strainers fluidly interposed between the condenser and the first fluid movement element and between the evaporator and the second fluid movement element.

7. The lubrication additive recovery system according to claim 3, further comprising sensors configured to sense fluid levels in the condenser and in the evaporator.

8. The lubrication additive recovery system according to claim 1, wherein:
the portion of the required supply of lubrication is drawn from the condenser and comprises pressurized refrigerant, and
the remainder of the required supply of lubrication is recovered from the evaporator and comprises a lubrication additive rich refrigerant mixture.

9. The lubrication additive recovery system according to claim 1, wherein the controller determines whether the magnitude of the portion of the required supply of lubrication, which is drawn from the condenser, is sufficient to meet a lubrication requirement of the bearing and, if so, operates the first fluid system and switches the second fluid system off, and, if not, operates the first and second fluid systems.

10. A lubrication additive recovery system for a vapor compression system including a compressor having a bearing, a condenser and an evaporator, the lubrication additive recovery system comprising:
an eductor;
a pump configured to pump a portion of a required supply of lubrication from the condenser and to the bearing through the eductor such that the eductor recovers a remainder of the required supply of lubrication from the evaporator for provision thereof to the bearing; and
a controller configured to control operations of at least the pump in accordance with a magnitude of the portion of the required supply of lubrication, which is drawn from the condenser, and in accordance with a magnitude of the remainder of the required supply of lubrication, which is recovered from the evaporator.

11. The lubrication additive recovery system according to claim 10, further comprising a lubrication ring through which the portion of the required supply of lubrication, which is drawn from the condenser, and the remainder of the required supply of lubrication, which is recovered from the evaporator, are pumped and provided to the bearing, respectively.

12. The lubrication additive recovery system according to claim 10, further comprising a valve fluidly interposed between the evaporator and the eductor and configured to permit fluid flow in only a single direction.

13. The lubrication additive recovery system according to claim 10, wherein the eductor comprises an inlet which is immediately downstream from the pump.

14. The lubrication additive recovery system according to claim 10, further comprising a single filter fluidly interposed between the eductor and the bearing.

15. The lubrication additive recovery system according to claim 10, further comprising strainers fluidly interposed between the condenser and the pump and between the evaporator and the eductor.

16. The lubrication additive recovery system according to claim 10, further comprising sensors configured to sense fluid levels in the condenser and in the evaporator.

17. The lubrication additive recovery system according to claim 10, wherein:
the portion of the required supply of lubrication is drawn from the condenser and comprises pressurized refrigerant, and
the remainder of the required supply of lubrication is recovered from the evaporator and comprises a lubrication additive rich refrigerant mixture.

18. The lubrication additive recovery system according to claim 10, wherein the controller determines whether the magnitudes of the portion of the required supply of lubrication, which is drawn from the condenser, is sufficient to meet a lubrication requirement of the bearing and, if so, operates the pump and switches the eductor off, and, if not, operates the pump and the eductor.

19. A bearing lubrication ring assembly, comprising:
a bearing; and
a lubrication ring disposed proximate to the bearing and formed to define first and second through-holes,
the first through-holes being receptive of a portion of a required supply of lubrication pumped from a condenser, and
the second through-holes being receptive of compressor discharge gas and a remainder of the required supply of lubrication drawn from an evaporator by the portion of the required supply of lubrication being pumped from the condenser,
wherein the bearing lubrication ring further comprises a controller configured to control a pumping of the portion of the required supply of lubrication from the condenser and an eduction of compressor discharge gas and a remainder of the required supply of lubrication drawn from the evaporator in accordance with a magnitude of the portion of the required supply of lubrication, which is pumped from the condenser, and in accordance with a magnitude of the remainder of the required supply of lubrication, which is recovered from the evaporator.

20. The bearing lubrication ring assembly according to claim 19, wherein:
the lubrication ring comprises an annular body disposed about the bearing, and
the first and second through-holes are respectively arranged in first and second separate arc-segments of the annular body.

* * * * *